United States Patent
Li et al.

(10) Patent No.: US 11,366,290 B2
(45) Date of Patent: Jun. 21, 2022

(54) LENS SYSTEM, FINGERPRINT IDENTIFICATION APPARATUS AND TERMINAL DEVICE

(71) Applicant: SHENZHEN GOODIX TECHNOLOGY CO., LTD., Shenzhen (CN)

(72) Inventors: Linxin Li, Shenzhen (CN); Wei Long, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 44 days.

(21) Appl. No.: 17/123,340

(22) Filed: Dec. 16, 2020

(65) Prior Publication Data
US 2021/0103128 A1    Apr. 8, 2021

Related U.S. Application Data (63) Continuation of application No. PCT/CN2018/101596, filed on Aug. 21, 2018.

(51) Int. Cl.
| | |
|---|---|
| *G02B 13/00* | (2006.01) |
| *G02B 9/10* | (2006.01) |
| *G06V 10/147* | (2022.01) |
| *G06V 40/13* | (2022.01) |

(52) U.S. Cl.
CPC ............. *G02B 13/003* (2013.01); *G02B 9/10* (2013.01); *G06V 10/147* (2022.01); *G06V 40/13* (2022.01)

(58) Field of Classification Search
CPC ........ G02B 13/003; G02B 9/10; G02B 13/24; G06V 10/147; G06V 40/13; G06V 40/1318; G06V 40/1324
See application file for complete search history.

(56) References Cited

U.S. PATENT DOCUMENTS

| | | | |
|---|---|---|---|
| 5,619,380 | A | 4/1997 | Ogasawara et al. |
| 5,812,327 | A | 9/1998 | Doh |
| 6,222,682 | B1 | 4/2001 | Saito et al. |
| 2004/0032653 | A1 | 2/2004 | Gohman |
| 2015/0022648 | A1 | 1/2015 | Kim et al. |
| 2016/0116712 | A1 | 4/2016 | Lee et al. |

FOREIGN PATENT DOCUMENTS

| | | |
|---|---|---|
| CN | 2690908 Y | 4/2005 |
| CN | 201429852 Y | 3/2010 |

(Continued)

OTHER PUBLICATIONS

Yang, K., "Design of several industrial camera based on machine vision", China Master's Theses Full-text Database, May 15, 2014, vol. 2, Part 4.2.4, together with an English language translation.

(Continued)

*Primary Examiner* — Abhishek Sarma
(74) *Attorney, Agent, or Firm* — Scully Scott Murphy & Presser (57) ABSTRACT

Embodiments of the present application provide a lens system, a finger identification apparatus and a terminal device, including a first lens, a second lens and a third lens arranged sequentially from an object side to an image side, where the first lens is a S-shaped meniscus negative optical power lens, the second lens is a biconvex positive optical power lens and a focal length of the first lens and a focal length of the second lens follow a first relationship so that a field of view (FOV) is greater than a first threshold.

12 Claims, 6 Drawing Sheets

(56) References Cited

FOREIGN PATENT DOCUMENTS

| | | |
|---|---|---|
| CN | 102067005 A | 5/2011 |
| CN | 102486825 A | 6/2012 |
| CN | 102768396 A | 11/2012 |
| CN | 103197493 A | 7/2013 |
| CN | 103576293 A | 2/2014 |
| CN | 103869450 A | 6/2014 |
| CN | 103885158 A | 6/2014 |
| CN | 103969797 A | 8/2014 |
| CN | 205486177 U | 8/2016 |
| CN | 106842518 A | 6/2017 |
| CN | 106896467 A | 6/2017 |
| CN | 107861229 A | 3/2018 |
| CN | 207133576 U | 3/2018 |
| CN | 107958237 A | 4/2018 |
| CN | 207181794 U | 4/2018 |
| CN | 207181795 U | 4/2018 |
| CN | 207529356 U | 6/2018 |
| CN | 207557977 U | 6/2018 |
| CN | 108761781 A | 11/2018 |
| CN | 208569169 U | 3/2019 |
| CN | 110737080 A | 1/2020 |
| EP | 1 335 227 A2 | 8/2003 |
| JP | 2007-147830 A | 6/2007 |

OTHER PUBLICATIONS

Zhang, W. et al., "Television Seeker of the Aerodynamic Missile." Beijing: China Atronautic Publishing Co., Ltd., Aug. 31, 1994, pp. 264-267, together with an English language abstract.

LENS SYSTEM, FINGERPRINT IDENTIFICATION APPARATUS AND TERMINAL DEVICE

CROSS-REFERENCE TO RELATED APPLICATIONS

This application is a continuation of International Application No. PCT/CN2018/101596, filed on Aug. 21, 2018, the disclosure of which is hereby incorporated by reference in its entirety.

TECHNICAL FIELD

Embodiments of the present application relate to optical imaging field, and more specifically, relate to a lens system, a fingerprint identification apparatus and a terminal device.

BACKGROUND

With the development of fingerprint identification sensor, due to its occupying no physical space on electronic device, an under-display fingerprint identification technology is becoming a technical trend. At present, the under-display fingerprint identification technology is based on the principle of light collimating, and resolution of an optical fingerprint identification module is determined by distribution period and aspect ratio of a light collimating unit. If the size of the optical fingerprint identification module is limited, a resolving power of the fingerprint identification is usually low, which affects the accuracy and security of fingerprint identification.

SUMMARY

A lens system, a fingerprint identification apparatus and a terminal device are provided in the present application, which can collect fingerprint information in a wide range and increase a resolving power of fingerprint identification when the size of a fingerprint module is limited, so as to improve the accuracy and security of fingerprint identification.

In a first aspect, a lens system is provided, including: a first lens and a second lens arranged sequentially from an object side to an image side, wherein:

the first lens is an S-shaped meniscus negative optical power lens, the second lens is a biconvex positive optical power lens, and a focal length of the first lens and a focal length of the second lens follow a first relationship so that a field of view (FOV) of the lens system is greater than a first threshold.

Therefore, in the lens system according to embodiments of the present application, lenses of different focal power are arranged and parameters are set to follow the first relationship, then the lens system is enabled with a large FOV, thereby improving the fingerprint identification performance of the optical fingerprint identification module which adopts the lens system.

In some possible implementation embodiments, the first relationship is: $-2.6 < f_1/f_2 < -1.6$, where $f_1$ is the focal length of the first lens, and $f_2$ is the focal length of the second lens.

In some possible implementation embodiments, the first threshold is 100 degrees.

In some possible implementation embodiments, the largest image height Y' on an imaging plane, a focal length f, and a distance from a lower surface of a display screen to the imaging plane of the lens system (TTL) follow a second relationship so that the focal length of the lens system is less than a second threshold.

In some possible implementation embodiments, the second relationship is: $0.2 < Y'/(f*TTL) < 0.6$.

In some possible implementation embodiments, the lens system further including:

a diaphragm, arranged between the first lens and the second lens.

In some possible implementation embodiments, at least one surface in the lens system is an aspherical surface.

In some possible implementation embodiments, a TV distortion of the lens system is less than 5%, a relative illuminance of the lens system is greater than 60%, and an F-number of the lens system is less than 1.6.

In some optional implementation embodiments, by setting at least one of radius of curvature, thickness, material, effective diameter and conic coefficient of each surface of the lens system, and/or an aspherical high order terms coefficient of an aspherical lens in the lens system, such as A2, A4, A6, A8, A10, A12, A14, A16, so that parameters of the lens system follow the first relationship and the second relationship, thereby making the FOV of the lens system greater than 100 degrees, the TV distortion of the lens system less than 5%, the F-number number of the lens system less than 1.6, and the relative illuminance of the lens system greater than 60%.

In a second aspect, a fingerprint identification apparatus is provided, including:

the lens system in the first aspect or any possible implementation embodiments of the first aspect.

In some possible implementation embodiments, the fingerprint identification apparatus further includes:

an image sensor, disposed under the lens system, configured to receive an optical signal transmitted by the lens system, and process the optical signal so as to obtain fingerprint information in the optical signal.

In some possible implementation embodiments, the fingerprint identification apparatus further includes: a holder, where the lens system is assembled in the holder with an interference fit.

In a third aspect, a terminal device is provided, including:

the lens system in the first aspect or any possible implementation embodiments of the first aspect.

In some possible implementation embodiments, the terminal device further includes:

a screen assembly, where includes a display screen, foam and copper foil, which are disposed on the fingerprint identification apparatus of the lens system where a corresponding area above the lens system in the foam and the copper foil is opened so that the optical signal with fingerprint information enters the lens system.

DESCRIPTION OF EMBODIMENTS

Technical solutions in embodiments of the present application will be described hereinafter with reference to the accompanying drawings.

It should be understood that embodiments of the present application could be applied to an optical fingerprint system, including, but not limiting to an optical fingerprint identification system and a medical diagnostic product based on optical fingerprint imaging. Embodiments of the present application are merely described by taking the optical fingerprint system as an example but not intended to impose any limitation on embodiments of the present application. Besides, embodiments of the present application are also applicable for other systems adopting the technology of optical imaging.

It should also be understood that, in addition to fingerprint identification, the technical solutions of the present application may perform other biometric identification, such as living body identification, to which are not limited in embodiments of the present application.

As a commonly application scenario, the optical fingerprint system provided in embodiments of the present application may be applied to smart phones, tablets and other mobile terminals with a display screen or other terminal devices. More specifically, in the foregoing terminal device, a fingerprint collecting apparatus may be a specific optical fingerprint apparatus, disposed in a partial region or an entire region under a display screen, thereby forming an under-display optical fingerprint system.

Figure 1:
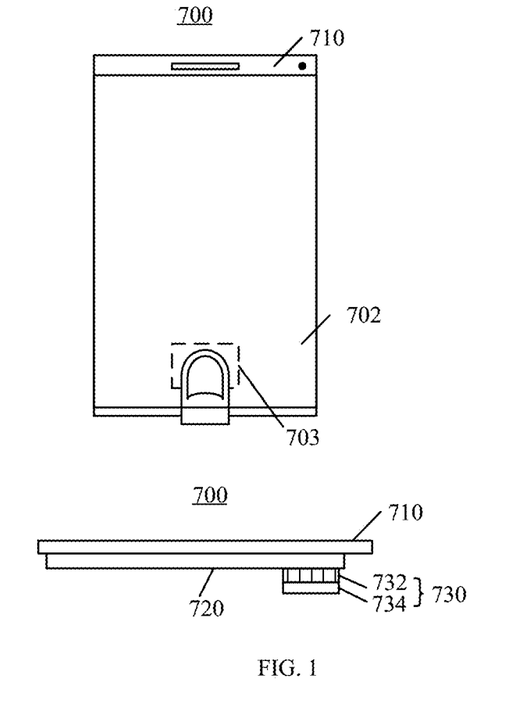
FIG. 1 is a schematic structural diagram of the terminal device applicable to embodiments of the present application.

FIG. 1 is a schematic structural diagram of the terminal device applicable to embodiments of the present application, a terminal device 700 includes a display screen 720 and an optical fingerprint apparatus 730, where the optical fingerprint apparatus 730 is disposed in a partial region under the display screen 720. The optical fingerprint apparatus 730 includes a sensing array with a plurality of optical sensing units, and a region where the sensing array 133 is located is a fingerprint detecting region 703 of the optical fingerprint apparatus 730. As shown in FIG. 1, the fingerprint detecting region 703 is disposed within a display region 702 of the display screen 720, therefore, it only requires to press a finger on the fingerprint detecting region 703 on the display screen 720 to input a fingerprint, when a user need to unlock the terminal device or perform other fingerprint verifications. Since the fingerprint detecting can be implemented in the screen, thus the terminal device 700 adopting the above-mentioned structure does not need to reserve a specific space on its front surface to set a fingerprint button (such as a Home button).

In a preferable embodiment, the display screen 720 may adopt a display screen with a self-emitting display unit, such as organic light-emitting diode (OLED) display screen or micro light-emitting diode (Micro-LED) display screen. Taking the OLED display screen as an example, the fingerprint apparatus 730 may use the display unit (that is, an OLED light source) of the OLED display screen 720, disposed at the fingerprint detecting region 703, as an excitation light source for optical fingerprint detection. In addition, the sensing array of the optical fingerprint apparatus 730 is specifically a photo detector array, which includes a plurality of photo detectors distributed in an array. The photo detectors may act as the above-mentioned optical sensing unit. When a finger is pressing the fingerprint detecting region 703, the display unit of the fingerprint detecting region 703 emits light which reflects on a fingerprint surface of a finger and thereby forming reflected light, where the reflected light on a ridge and a valley of the fingerprint is different. Reflected light emitted from the display screen 720 is received by the photo detector and transformed to a corresponding electrical signal, i.e. a fingerprint detecting signal. A fingerprint image data can thus be obtained based on the fingerprint detecting signal, and a further fingerprint matching can be performed so as to implementing an optical fingerprint identification function at the terminal device 700.

It should be understood that, in a specific implementation manner, the terminal device 700 further includes a transparent protecting cover 710, the cover 710 may be a glass cover or a sapphire cover, which is located above the display screen 720 and covers a front surface of the terminal device 700. Therefore, in embodiments of the present application, the so-called the finger pressing on the display screen 720 is actually referred to pressing on the cover 710 above the display screen 720 or a surface of the protective layer covering the cove 710.

In an optional implementation manner, as shown in FIG. 1, the optical fingerprint apparatus 730 includes a light detecting portion 734 and an optical component 732, where the light detecting portion 734 includes the sensing array and a reading circuit or other auxiliary circuit electrically connected to the sensing array, and it can be produced to a die with semiconductor technology. The optical component 732 may be disposed above the sensing array of the light detecting portion 734, and it may specifically include a filter layer, a light directing layer and other optical elements. The filter layer may be configured to filter ambient light penetrating the finger, and the light directing layer is mainly configured to direct the reflected light reflecting from the finger surface to the sensing array for optical detection.

In a specific implementation manner, the optical component 732 may be encapsulated on a same optical fingerprint chip with the light detecting portion 734. Where the light directing layer may specifically be a lens layer made on a semiconductor silicon wafer, with a plurality of lens units. The reflected light reflecting from the finger is penetrating the lens unit and received by the optical sensing unit under such, therefore, the sensing array may detect a fingerprint image of the finger.

In the optical fingerprint apparatus 730, each lens unit may be corresponding to one of optical sensing unit among the sensing array respectively. Alternatively, the lens units may also not be one-to-one corresponding to the optical sensing units of the sensing array to reduce interference of Morie fridges, for example, an optical sensor unit may be corresponding to a plurality of lens units. Or, the lens units may also adopt a method of irregular arrangement. The lens units adopting an irregular arrangement may calibrate the reflected light detected by each sensing unit with post software algorithm.

In some alternative implementation embodiments, the display screen 720 may adopt a non-self-emitting display screen, such as a backlight liquid crystal display screen; under such circumstance, the optical detecting apparatus 730 may fail to take the display unit of the display screen 720 as an excitation light source, therefore it requires to integrate an excitation light source inside the optical detecting apparatus 730 or dispose an excitation light source outside the optical fingerprint apparatus 730 to implement optical fingerprint detection, where its detecting theory is consistent with the content described above.

It should be understood that, in embodiments in the present application, the sensing array in the optical fingerprint device may also be called an image sensor (Sensor), or a photosensor, which can be produced to a DIE with semiconductor technology, where the DIE includes the image sensor.

It should also be understood that the optical fingerprint apparatus in embodiments of the present application may also be called an optical fingerprint identification module, a fingerprint identification apparatus, a fingerprint identification module, a fingerprint module and a fingerprint collecting apparatus, etc.

To better understand embodiments of the present application, some performance indexes are introduced first.

Field of view (FOV) indicates a view range of a lens. When size of the lens is identical, a greater FOV of the lens indicates that the lens can obtain a larger area of information, that is, a larger amount of information that can be obtained by using the lens with a large FOV.

F-number indicates the amount of light that penetrates the lens to the sensing array of the optical fingerprint apparatus. A smaller F-number indicates a larger amount of light penetrating the lens.

TV distortion is used to measure the degree of visual distortion of an image. It can be understood that a smaller TV distortion, a better performance of imaging.

Relative illuminance may indicate a ratio of an illuminance of different coordinate points on the imaging plane to an illuminance of a center point. A smaller relative illuminance, a more inhomogeneous illuminance of the imaging plane, which would lead to an underexposure at some points and an overexposure at the center point, that effects imaging quality; that is, a greater relative illuminance, a better imaging quality.

Figure 2:
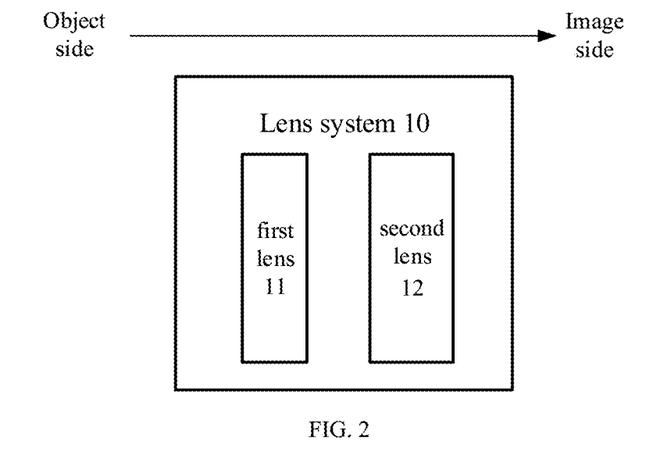
FIG. 2 is a schematic structural diagram of the lens system according to embodiments of the present application.

FIG. 2 is a schematic structural diagram of the lens system according to embodiments of the present application. As shown in FIG. 2, the lens system 10 includes: a first lens 11 and a second lens 12 disposed sequentially from an object side to an image side, where the first lens 11 is a negative optical power lens, the second lens 12 is a positive optical power lens.

Specifically, the first lens is an S-shaped meniscus negative optical power lens, the second lens is a biconvex positive optical power lens, that is, the first lens 11 may be a concave lens and the second lens 12 may be a convex lens.

It should be understood that, in embodiments of the present application, the first lens may be a concave lens, or also be a set of lenses, as long as a combined optical power of the set of lenses is a negative optical power. Likewise, the second lens may be a convex lens, or also be a set of lenses, as long as a combined focal power of the set of lenses is a positive optical power.

Optionally, in some embodiments, the first lens and the second lens may be made of resin materials, or other plastic materials, which are not limited in embodiments of the present application.

Further, a focal length of the first lens and a focal length of the second lens follow a first relationship so that a FOV is greater than a first threshold.

It should be understood that, here, the focal lengths of the first lens and the second lens following the first relationship may be a ratio of the focal length of the first lens to the focal length of the second lens being in a specific range, or a ratio of the focal length of the first lens to the combined focal length of the lens system being in a specific range, or a ratio of the focal length of the second lens to the combined focal length of the lens system being a specific range, which is not limited in embodiments of the present application.

That is, in embodiments of the present application, at least two of the focal length of the first lens, the focal length of the second lens and the combined focal length of the lens system can be set to follow a certain relationship so that the lens system is enabled with a large FOV. Thus, the fingerprint identification module using the lens system can collect fingerprint information in a wide range, thereby improving accuracy and security of fingerprint identification.

Optionally, in some embodiments, the first relationship may be: $-2.6<f_1/f_2<-1.6$, where $f_1$ is the focal length of the first lens and $f_2$ is the focal length of the second lens.

That is, by setting the ratio of the first lens to the second lens to be in a specific range so as to enable the lens system with a large FOV.

Optionally, in some embodiments, the first threshold is 100 degrees.

Therefore, parameters of the lens system can be set to follow the first relationship so that the FOV of the lens system is greater than 100 degrees. Thus, under the condition of sizes of the lenses being the same, fingerprint information in a wider area can be collected, which is in favor of improving the resolved force of fingerprint identification.

Optionally, in some embodiments, the F-number of the lens system is less than 1.6, then there will be enough light allowed to enter the lens system, which is in favor of collecting weak fingerprint signals, at the meantime, the exposure time and power consumption can be reduced.

Optionally, in some embodiments, the TV distortion of the lens system is less than 5%, which is in favor of avoiding the effect of Morie fringes on fingerprint imaging.

Optionally, in some embodiments, the relative illuminance of the lens system is greater than 60%, which is in favor of improving imaging quality.

Therefore, in the lens system according to embodiments of the present application, lenses of different focal power are disposed and parameters are set to follow the first relationship, then the lens system is enabled with a large FOV, a small F-number, a small TV distortion and a large relative illuminance, thereby improving the fingerprint identification performance of the optical fingerprint identification module which adopts the lens system.

Optionally, in some embodiments, the largest image height Y' on an imaging plane, a focal length f, and a distance TTL (i.e., a total track length) from a lower surface of a display screen to the imaging plane of the lens system follow a second relationship so that the focal length of the lens system is less than a second threshold.

It should be understood that, the size of TTL determines the focal length of the lens system, or, the size of the lens system. In embodiments of the present application, by controlling Y', f and TTL to follow the second relationship, so that the lens system can not only has a larger FOV but a shorter focal length, thus the lens system can be better applied to those terminal devices that have specific requirements on size.

It may be understood that the display screen may be a display screen of an electronic device equipped with the lens system, the imaging plane may be a surface of the image sensor, which may be corresponding to the DIE in the optical fingerprint identification module, i.e. the portion which detects an optical signal.

Optionally, the second threshold may be 5 millimeters or 3 millimeters, etc., which is not limited in embodiments of the present application, but only matches requirements of the size of the terminal device.

Optionally, in some embodiments, the second relationship is: $0.2<Y'/(f*TTL)<0.6$.

Optionally, in some embodiments, the lens system further including:

a diaphragm, arranged between the first lens and the second lens.

Specifically, the diaphragm may be configured to regulate the size of the optical signal or imaging range. The optical signal or the imaging range can be regulated by setting the diaphragm, so that the optical signal with fingerprint information can be maximally imaged on the surface of the image sensor in the optical fingerprint identification module, thereby making the image sensor obtain more fingerprint information and enhancing the resolved power of fingerprint identification.

In conclusion, the lens system in embodiments of the present application is a wide-angle angle short focal length lens. The design of the wide angle enables the lens system to collect fingerprint information in a wider area, and the design of the short focal length enables the lens system to occupy a smaller space. Therefore, the lens system may not only implement better performance of fingerprint identification but meet the requirements on size of the terminal device, thereby improving applicability of the lens system.

Optionally, in some embodiments, physical parameters such as radius of curvature, thickness, material, effective diameter and conic coefficient of each structural part (for example, the first lens, the second lens, and the diaphragm) of the lens system, and/or an aspherical high order terms coefficient (for example, even order terms of A2-A16) of an aspherical lens in the lens system can be controlled, so that parameters of the lens system follow the first relationship and the second relationship, thereby making the FOV of the lens system greater than 100 degrees, TV distortion of the lens system less than 5%, the relative illuminance of the lens system greater than 60%, F number of the lens system less than 1.6, which will be described in detail below in conjunction with specific embodiments.

It should be understood that the lens system in embodiments of the present application may be applied to an optical fingerprint identification module, where the lens system may be combined with an image sensor of the optical fingerprint identification module to realize imaging of fingerprint information in a wider range in a limited space; or, the lens system may also be applied to applied to other devices or apparatuses that requires higher performance in optical imaging, which are not limited in the embodiments of the present application.

Figure 3:
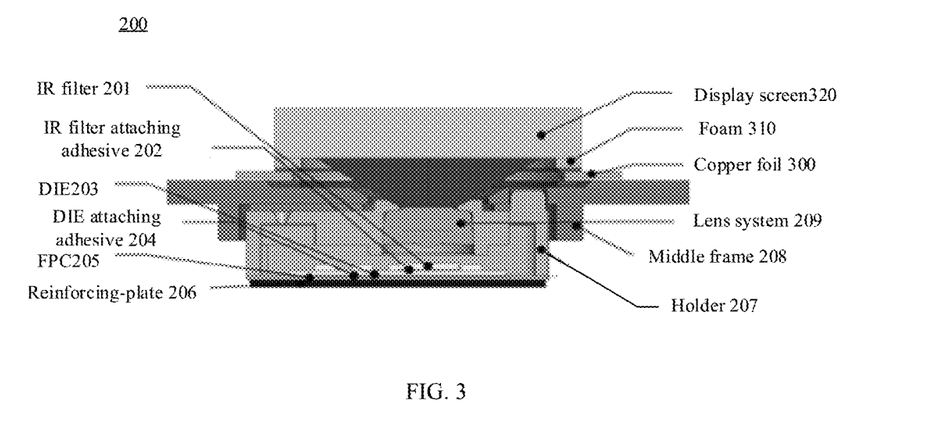
FIG. 3 is a schematic structural diagram of the optical fingerprint identification module according to embodiments of the present application.

FIG. 3 is a schematic structural diagram of an optical fingerprint identification module according to embodiments of the present application. As shown in FIG. 3, the optical fingerprint identification module 200 may include: an infrared filter (Infrared filter, IR Filter) 201, an IR filter attaching adhesive 202, a DIE 203, a DIE attaching adhesive 204, a flexible printed circuit (FPC) 205, a reinforcing-plate 206, a holder 207 and a lens system 209.

Where the IR filter is configured to filter infrared to avoid effect of infrared on fingerprint imaging;

the IR filter attaching adhesive 202 is configured to adhere the IR filter 201 to DIE 203;

the DIE 203, corresponding to the light detector portion 734 in FIG. 1, is configured to transform an optical signal to an electrical signal, and can be combined with the lens system 209 to transform the optical signal imaged by the lens system 209 to the electrical signal;

the DIE attaching adhesive 204, is configured to fix the DIE 203 with the flexible printed circuit (FPC) 205;

the FPC 205, is configured to connect the DIE 203 and a circuit in the electronic apparatus installed in the optical fingerprint identification module;

the holder 207, is configured to fix the lens system 209 with the DIE 203 so as to control the accuracy of defocus and eccentricity.

There is also a display module disposed on the optical fingerprint identification module 200, including a display screen 320, foam 310 and copper foil 300.

In embodiments of the present application, the lens system 209 may be assembled in the holder 207 with an interference fit so that the lens system 209 can be adhesive to the DIE 203. Therefore every structure of the optical fingerprint identification module can be adhesive to one another, thereby fixing the optical fingerprint identification module to a middle frame 208 of the electronic apparatus.

Since there is optical signal transmission between the lens system 209 and the display screen 320, an opening is needed in the foam 310 and the copper foil 300 in the display module corresponding to the lens system 209 so that the optical signal within the range of FOV of the lens system 209 can pass.

Now, detailed description of the performance of the lens system in embodiments of the present application is given with reference to embodiment 1 and embodiment 2.

Figure 4:
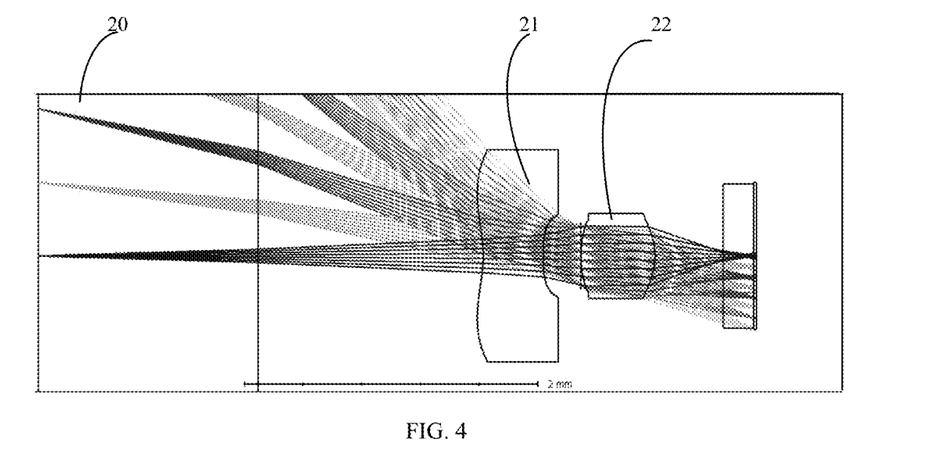
FIG. 4 is a schematic diagram of one layout of the lens system according to embodiments of the present application.
Figure 5:
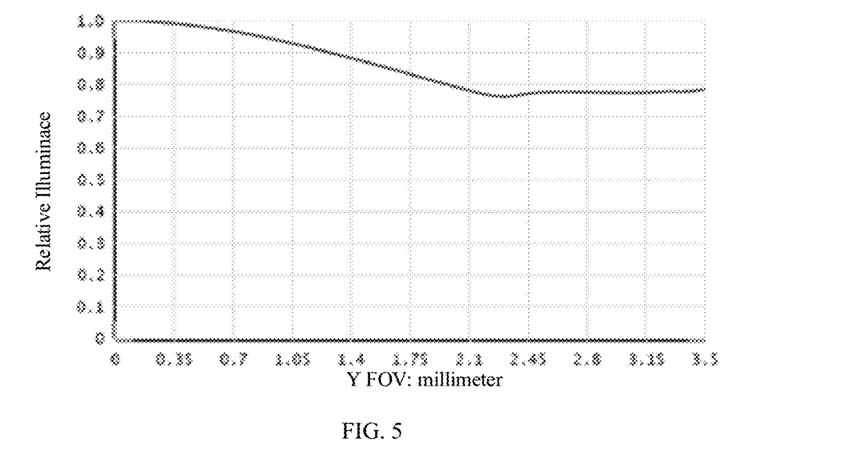
FIG. 5 is a diagram of relative illuminance of the lens system layout as shown in FIG. 4.
Figure 6:
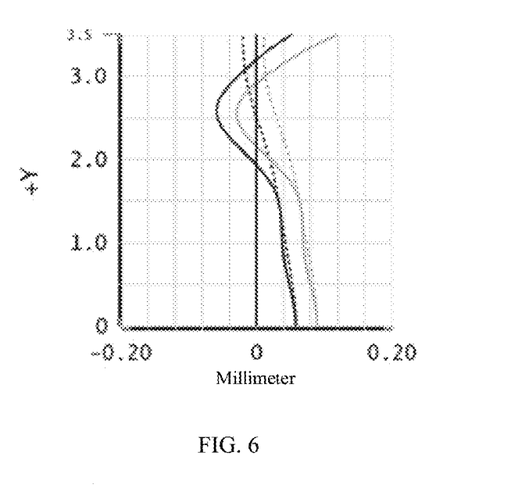
FIG. 6 is a diagram of astigmatism of the lens system layout as shown in FIG. 4.
Figure 7:
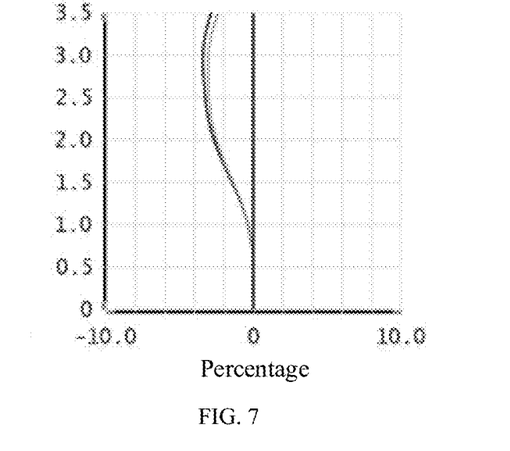
FIG. 7 is a diagram of TV distortion of the lens system layout as shown in FIG. 4.
Figure 8:
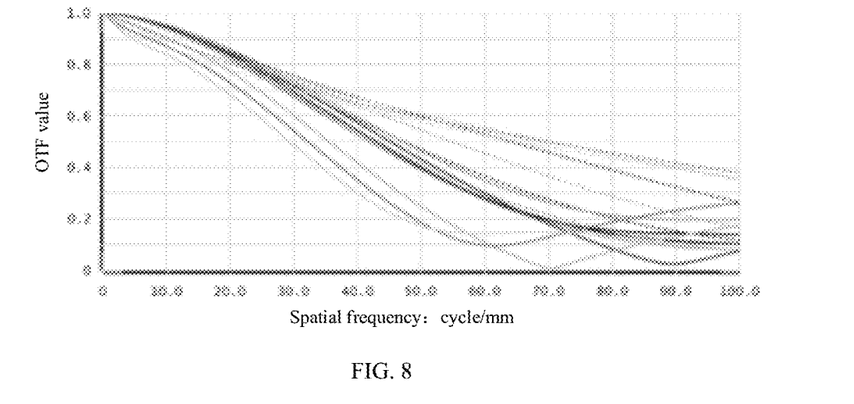
FIG. 8 is a diagram of MTF of the lens system layout as shown in FIG. 4.
Figure 9:
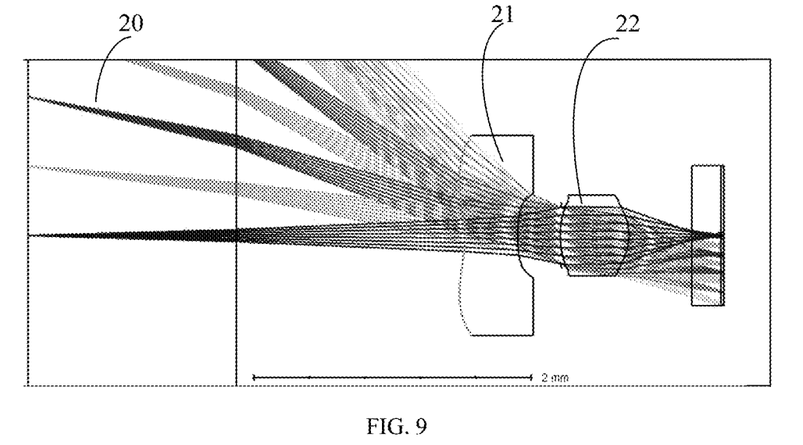
FIG. 9 is a schematic diagram of another layout of lens system according to embodiments of the present application.
Figure 10:
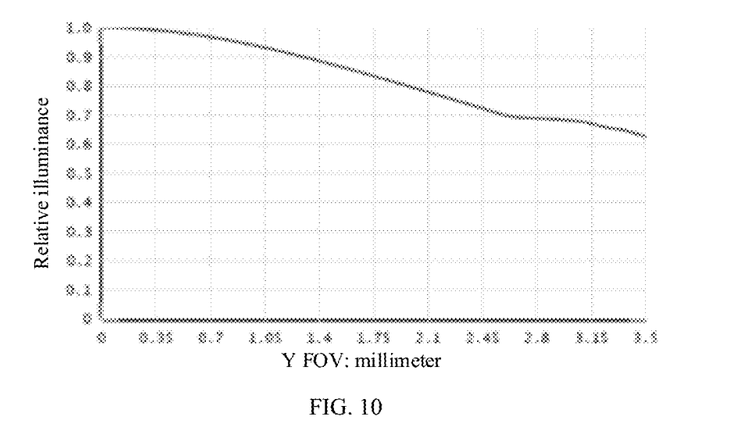
FIG. 10 is a diagram of relative illuminance of the lens system layout as shown in FIG. 9.
Figure 11:
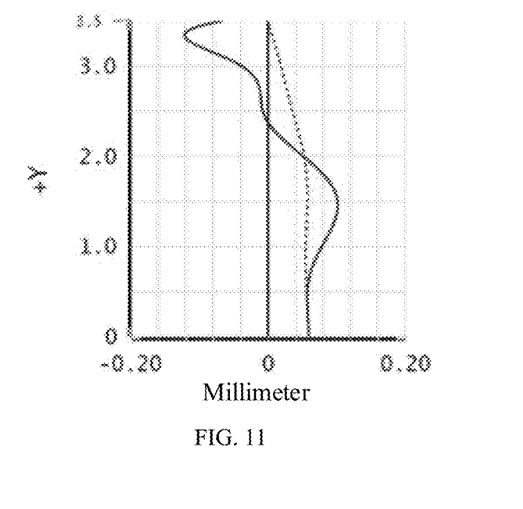
FIG. 11 is a diagram of astigmatism of the lens system layout as shown in FIG. 9.
Figure 12:
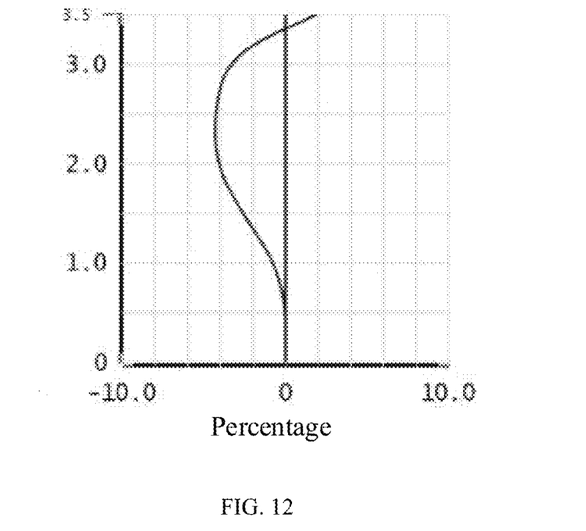
FIG. 12 is a diagram of TV distortion of the lens system layout as shown in FIG. 9.
Figure 13:
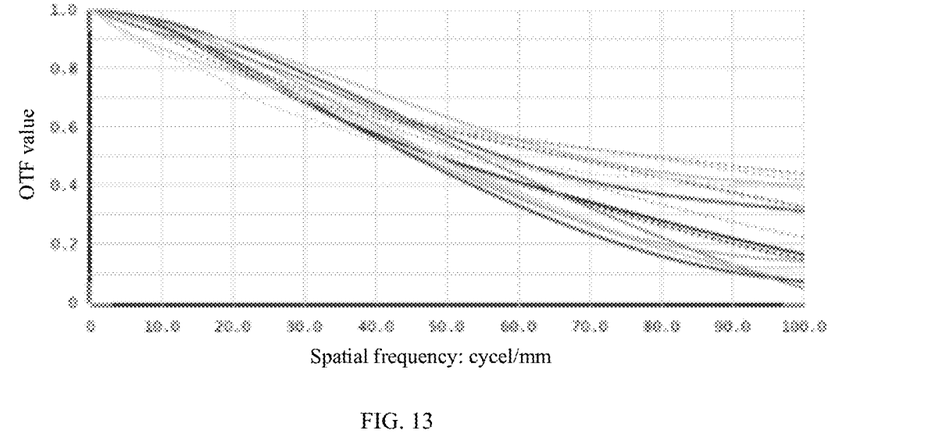
FIG. 13 is a diagram of MTF of the lens system layout as shown in FIG. 9.

In the embodiment 1 and the embodiment 2, the lens system includes two sets of lens and a diaphragm. FIG. 4 and FIG. 9 show two layouts of the lens system in the embodiments 1 and the embodiment 2, respectively, in which there are a display screen 20, a first lens 21, a diaphragm, a second lens 22, an IR filter and filter attaching adhesive, arranged sequentially from the object side to the image side.

Where the first lens 21 and the second lens 22 are respectively corresponding to the above-mentioned first lens 11 and the second lens 12, that is, the first lens 21 is a concave lens and the second lens 22 is a convex lens.

In the convenience of distinguishing and description, according to the order from the object side to the image side, the upper surface and the lower surface of the display screen 20 are marked as S1 and S2 respectively, two surfaces of the first lens 21 are marked as S3 and S4, the surface of the diaphragm of are marked as S5, two surfaces of the second lens 22 are marked as S6 and S7, surfaces of the IR filter are marked as S8 and S9 respectively, surfaces of the filter attaching adhesive 26 are marked as S10 and S11 and the imaging plane is S12.

Further, by setting at least one of radius of curvature, thickness, material, effective diameter and conic coefficient of each surface of the lens system, and/or an aspherical high order terms coefficient of an aspherical lens in the lens system, including A2, A4, A6, A8, A10, A12, A14, A16, so that parameters of the lens system follow the first relationship and the second relationship, thereby making the FOV greater than 100 degrees, the TV distortion less than 5%, the F-number less than 1.6, and the relative illuminance greater than 60%, in the lens system.

Herein after, the first relationship is $-2.6 < f_1/f_2 < -1.6$ and the second relationship is $0.2 < Y'/(f*TTL) < 0.6$, which are described as examples but to which the present application is not limited.

For example, in the embodiment 1, radius of curvature, thickness, material, effective diameter, conic coefficient of each surface in S1-S12 can be configured to adopt corresponding parameters in Table 1, where the aspherical high order terms coefficient of the aspherical surfaces in S1-S12 adopts parameters as shown in Table 2.

TABLE 1

| Surface | Type of surface | Radius of curvature | Thickness | Material | Effective diameter | Conic coefficient |
|---|---|---|---|---|---|---|
| S1 | Object surface | Infinite | 1.5 | BK7 | 3.5 | |
| S2 | Spherical surface | Infinite | 1.535 | | 2.616 | |
| S3 | Aspherical surface | 2.392 | 0.409 | APL5014CL | 0.721 | 7.713 |
| S4 | Aspherical surface | 0.702 | 0.257 | | 0.283 | −14.748 |
| S5 | Diaphragm surface | Infinite | 0 | | 0.197 | |
| S6 | Aspherical surface | 0.757 | 0.505 | OKP1 | 0.251 | 3.202 |
| S7 | Aspherical surface | −6.110 | 0.463 | | 0.287 | −4.11E39 |
| S8 | Spherical surface | Infinite | 0.021 | D263TECO | 0.395 | |
| S9 | Spherical surface | Infinite | 0.020 | BK7 | 0.488 | |
| S12 | Image surface | | | | 0.497 | |

It should be understood that, the position corresponding to the parameter in Table 1 to Table 4 in embodiments of the present application are blank to indicate no such parameter, for example, the blank in the material may indicate air.

It should be noted that in the embodiment 1 and the embodiment 2, S9 and S10 may be considered as a same surface, and S11 and S12 may be considered as a same surface, that is, S10 and S9 are corresponding to a same parameter, and S10 and S9 are corresponding to a same parameter, thus parameters corresponding to S10 and S11 are not shown.

TABLE 2

| Surface | A2 | A4 | A6 | A8 | A10 | A12 | A14 | A16 |
|---|---|---|---|---|---|---|---|---|
| S3 | −0.79 | 3.23 | −11.043 | 25.473 | −23.280 | −33.485 | 99.840 | −69.249 |
| S4 | −0.326 | 2.010 | 913.950 | 4.803e4 | 1.326e6 | 1.962e7 | 1.494e8 | 4.519e8 |
| S6 | 4.122 | −1.303 | 194.141 | 1.067e4 | 2.906e5 | 4.070e6 | 2.874e7 | 7.583e7 |
| S7 | −1.167 | 1.589 | −19.044 | 41.413 | 7948.506 | 5.395e4 | 2.939e4 | 4.602e5 |

Based on parameters shown in Table 1 and Table 2, it can be determined that parameters of the lens system in the embodiment 1 are as follows: TTL=3.4 (i.e., the distance from S2 to S12, $f_1$=−0.88445, $f_2$=0.822380, $f_3$=0.48554, f=0.40994, $f_1/f_2$=−1.822, Y'/(f*TTL)=0.424, that is, parameters of the lens system follow the first relationship and the second relationship mentioned above. Under the above parameters, FIG. 5 to FIG. 8 are sequentially diagram of relative illuminance, diagram of astigmatism, diagram of TV distortion and diagram of MTF of optical transfer function.

From simulation diagrams as shown in FIG. 5 to FIG. 8, the FOV of the lens system is 106 degrees, the F-number of the lens system is 1.5869, the TV distortion of the lens system is −3.036% and the relative illuminance of the lens system is 78.2%. Thus, with the lens system following the above-mentioned first relationship and the second relationship, the lens system has the performance of large FOV, small F-number, small TV distortion and high relative illuminance.

For another example, in the embodiment 2, radius of curvature, thickness, material, effective diameter, conic coefficient of each surface in S1-S12 can be configured to adopt corresponding parameters in Table 3, the aspherical high order terms coefficient of the aspherical surfaces in S1-S12 adopts parameters as shown in Table 4.

TABLE 3

| Surface | Type of surface | Radius of curvature | Thickness | Material | Effective diameter | Conic coefficient |
|---|---|---|---|---|---|---|
| S1 | Object surface | Infinite | 1.5 | BK7 | 3.5 | |
| S2 | Spherical surface | Infinite | 1.646 | | 2.647 | |
| S3 | Aspherical surface | 2.526 | 0.380 | APL5014CL | 0.721 | 9.226 |
| S4 | Aspherical surface | 0.702 | 0.311 | | 0.304 | −6.892 |
| S5 | Diaphragm surface | Infinite | 0 | | 0.202 | |
| S6 | Aspherical surface | 0.704 | 0.495 | APL5014CL | 0.253 | 2.957 |
| S7 | Aspherical surface | −0.845 | 0.452 | | 0.291 | −8.793e39 |
| S8 | Spherical surface | Infinite | 0.21 | D263TECO | 0.409 | |
| S9 | Spherical surface | Infinite | 0.02 | BK7 | 0.496 | |
| S12 | Image surface | | | | 0.505 | |

TABLE 4

| Surface | A2 | A4 | A6 | A8 | A10 | Al2 | A14 | A16 |
|---|---|---|---|---|---|---|---|---|
| S3 | −0.790 | 3.249 | −10.931 | 25.502 | −23.135 | −33.495 | 99.102 | −69.443 |
| S4 | −0.441 | 2.639 | 882.874 | 4.818e4 | 1.328e6 | 1.965e7 | 1.495e8 | 4.557e8 |
| S6 | 0.063 | −1.423 | 191.242 | 1.075e4 | 2.901e5 | 4.064e6 | 2.878e7 | 7.651e7 |
| S7 | −1.369 | 1.718 | −21.031 | 35.880 | 8124.488 | 5.133e4 | 1.185e4 | 4.905e5 |

Based on parameters shown in Table 3 and Table 4, it can be determined that parameters of the lens system in the embodiment 1 are as follows: TTL=3.4 (i.e., the distance from S2 to S12), $f_1$=4.007, $f_2$=0.415, =0.311, $f_1/f_2$=−2.427, Y'/(f*TTL)=0.468, that is, parameters of the lens system follow the first relationship and the second relationship mentioned above. Under the above parameters, FIG. 10 to FIG. 13 are sequentially diagram of relative illuminance, diagram of astigmatism, diagram of TV distortion and diagram of MTF.

From simulation diagrams as shown in FIG. 10 to FIG. 13, the FOV of the lens system is 109 degrees, the F-number of the lens system is 1.518, the TV distortion of the lens system is −4.17% and the relative illuminance of the lens system is 62.5%. Thus, with the lens system following the above-mentioned first relationship and the second relationship, the lens system has the performance of large FOV, small F-number, small TV distortion and high relative illuminance.

In conclusion, the lens system in embodiments of the present application provides a wide-angle short focal length lens. The lens system can implement collecting fingerprint information of a wider range, and the design of the short focal length enables the lens system to better apply to the terminal device with specific requirements on size, which improve the applicability of the lens system.

Figure 14:
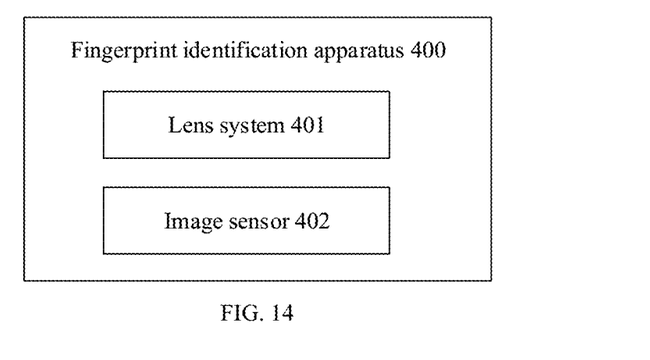
FIG. 14 is a schematic structural diagram of the fingerprint identification apparatus according to embodiments of the present application.

FIG. 14 is a schematic structural diagram of the fingerprint identification apparatus according to embodiments of the present application. As shown in FIG. 14, the fingerprint identification apparatus 400 may include a lens system 401, and the lens system 401 may be the lens system 10 in above-mentioned embodiment.

Optionally, the fingerprint identification apparatus may include an image sensor 402, disposed under the lens system 10, is configured to receive an optical signal transmitted by the lens system, and process the optical signal so as to obtain fingerprint information from the optical signal.

It should be understood that the fingerprint identification apparatus 400, corresponding to the optical fingerprint identification module 200 shown in FIG. 3, may also include the structure in the optical fingerprint identification module 200, for example, the IR filter 201 and the holder 207 etc., which are not described in detail here.

Figure 15:
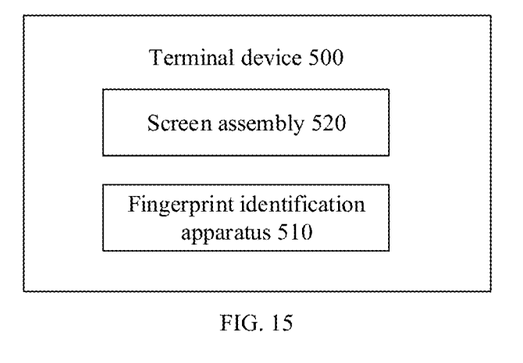
FIG. 15 is a schematic block diagram of the terminal device according to embodiments of the present application.

A terminal device is also provided in embodiments of the present application, as shown in FIG. 15, the terminal device 500 includes a fingerprint identification apparatus 510, which may be the fingerprint identification apparatus 400 in above-mentioned embodiment, or the optical fingerprint identification module 200 shown in FIG. 3

Optionally, the terminal device may further includes: a screen assembly 520, where includes a display screen, a foam and a copper foil, which are disposed above the lens system in the fingerprint identification apparatus 510;

where a corresponding area above the lens system in the foam and the copper foil is opened, so that the optical signal with fingerprint information enters the lens system.

By way of example but not limitation, the terminal device 500 may be cellphones, tablet computers, desk computers, in-vehicle electronic devices and wearable smart devices etc. The wearable intelligent device includes a device, such as a smart watch or smart glasses, that is of a full function and a large size and that can implement all or some functions without relying on a smartphone, and a device, such as a smart band or smart jewelry that performs sign monitoring, that is dedicated to only one type of application function and that needs to be used together with another device such as a smartphone.

It should be understood that the specific examples in the embodiments of the present application are only to help those skilled in the art to better understand the embodiments of the present application, but not to limit the scope of the embodiments of the present application. Various modifications and variations which fall within the scope of the present application can be made by those skilled in the art based on the foregoing embodiments.

The foregoing descriptions are merely specific implementation embodiments of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application.

What is claimed is:

1. A lens system, comprising: a first lens and a second lens arranged sequentially from an object side to an image side, wherein the first lens is an S-shaped meniscus negative optical power lens, the second lens is a biconvex positive optical power lens, and a focal length of the first lens and a focal length of the second lens follow a first relationship so that a field of view (FOV) of the lens system is greater than a first threshold; the first relationship is: $-2.6 < f_1/f_2 < -1.6$, wherein $f_1$ is the focal length of the first lens and $f_2$ is the focal length of the second lens, and wherein the largest image height Y' on an imaging plane, a focal length f, and a distance from a lower surface of a display screen to the imaging plane of the lens system (TTL) follow a second relationship so that the focal length of the lens system is less than a second threshold, the second relationship is: $0.2 < Y'/(f*TTL) < 0.6$.

2. The lens system according to claim 1, where the first threshold is 100 degrees.

3. The lens system according to claim 1, wherein the lens system further comprises:
a diaphragm, arranged between the first lens and the second lens.

4. The lens system according to claim 1, wherein at least one surface in the lens system is an aspherical surface.

5. The lens system according to claim 1, wherein a TV distortion of the lens system is less than 5%, a relative illuminance of the lens system is greater than 60%, and an F-number of the lens system is less than 1.6.

6. The lens system according to claim 1, wherein by setting at least one of radius of curvature, thickness, material, effective diameter and conic coefficient of each surface of the lens system, and/or an aspherical high order terms coefficient of an aspherical lens in the lens system, so that parameters of the lens system follow the first relationship.

7. A fingerprint identification apparatus, comprising a lens system, wherein the lens system, comprises: a first lens and a second lens arranged sequentially from an object side to an image side, the first lens is an S-shaped meniscus negative optical power lens, the second lens is a biconvex positive optical power lens, and a focal length of the first lens and a focal length of the second lens follow a first relationship so that a field of view (FOV) of the lens system is greater than a first threshold; the first relationship is: $-2.6 < f_1/f_2 < -1.6$, wherein $f_1$ is the focal length of the first lens and $f_2$ is the focal length of the second lens, and wherein the largest image height Y' on an imaging plane, a focal length f, and a distance from a lower surface of a display screen to the imaging plane of the lens system (TTL) follow a second relationship so that the focal length of the lens system is less than a second threshold, the second relationship is: $0.2 < Y'/(f*TTL) < 0.6$.

8. The fingerprint identification apparatus according to claim 7, wherein a TV distortion of the lens system is less than 5%, a relative illuminance of the lens system is greater than 60%, and an F-number of the lens system is less than 1.6.

9. The fingerprint identification apparatus according to claim 8, further comprising: a holder, wherein the lens system is assembled in the holder with an interference fit.

10. The fingerprint identification apparatus according to claim 7, wherein the fingerprint identification apparatus further comprises:
an image sensor, disposed under the lens system, configured to receive an optical signal transmitted by the lens system, and process the optical signal so as to obtain fingerprint information in the optical signal.

11. A terminal device, comprising: a fingerprint identification apparatus, wherein the fingerprint identification apparatus comprises a lens system, wherein the lens system, comprises: a first lens and a second lens arranged sequentially from an object side to an image side, the first lens is an S-shaped meniscus negative optical power lens, the second lens is a biconvex positive optical power lens, and a focal length of the first lens and a focal length of the second lens follow a first relationship so that a field of view (FOV) of the lens system is greater than a first threshold; the first relationship is: $-2.6 < f_1/f_2 < -1.6$, wherein $f_1$ is the focal length of the first lens and $f_2$ is the focal length of the second lens, and wherein the largest image height Y' on an imaging plane, a focal length f, and a distance from a lower surface of a display screen to the imaging plane of the lens system (TTL) follow a second relationship so that the focal length of the lens system is less than a second threshold, the second relationship is: $0.2 < Y'/(f*TTL) < 0.6$.

12. The terminal device according to claim 11, wherein the terminal device further comprises:
a screen assembly, which includes the display screen, a foam and a copper foil, which are disposed on the fingerprint identification apparatus of the lens system;
wherein a corresponding area above the lens system in the foam and the copper foil is opened so that the optical signal with fingerprint information enters the lens system.

* * * * *